Patented June 15, 1943

2,321,889

UNITED STATES PATENT OFFICE 2,321,889

RUBBER COATED FERROUS METAL ARTICLE AND PROCESS

George Corbin Bailey, Elizabeth, and Oscar Johnson, Metuchen, N. J., assignors to E. I. du Pont de Nemours & Company, Wilmington, Del., a corporation of Delaware No Drawing. Application September 23, 1939, Serial No. 296,288

16 Claims. (Cl. 117—79)

The present invention relates to rubber coated ferrous metal articles and to a method of making the same, and more particularly to the application of protective rubber coatings to the inner surfaces of ferrous metal containers.

It is frequently desirable to protect the surfaces of ferrous metal articles, e. g., iron or steel articles, against the action of chemical substances or to prevent the contamination of substances, e. g., formaldehyde solutions, with iron when such substances are stored or transported in iron or steel containers. Rubber is known to be a suitable protective material for this purpose and various methods have been proposed for applying protective rubber coatings to iron and steel surfaces. Rubber coatings applied directly to such surfaces, for example by the use of rubber latex, do not adhere satisfactorily to the metal surface and it has been proposed to employ intermediate coatings of adhesive materials such as asphalt, synthetic resins, lacquers, and the like, for the purpose of improving the bond between the rubber coating and the metal surface. The use of such intermediate adhesive coatings has been found to be impractical and it is generally considered necessary to apply an intermediate adhesive coating consisting of a rubber cement or a rubber isomer composition to the metal surface prior to the application of rubber by means of dispersions of rubber such as a rubber latex. The use of intermediate coatings of rubber cements and the like is not always convenient, usually involves the use of inflammable solvents, and is relatively expensive in certain instances.

It is an object of the present invention to provide a cheap yet practical method of applying protective rubber coatings, using aqueous dispersions of rubber, to the surfaces of ferrous metal articles and to provide improved rubber coated articles resulting from the practice of our improved method. A further object is to provide improved ferrous metal containers for chemical substances, particularly for formaldehyde solutions, which containers have their inner surfaces protected from the action of the solutions contained therein by means of a protective rubber lining which is bonded to the metal surface by means of novel bonding compositions. These and still further objects of our invention will be obvious from the ensuing description of the invention.

The above objects may be accomplished in accordance with our invention by applying a metal primer composition to clean surfaces of ferrous metal articles prior to the application thereto of an aqueous dispersion of rubber, e. g., a rubber latex composition, for the purpose of bonding the final protective rubber coating to the metal surfaces. The term "metal primer composition" is used herein and in the appended claims to designate a coating composition containing a drying constituent, such as linseed oil and the like, as well as a pigment in substantial amounts. We have discovered that such metal primer compositions, for example, primer compositions as defined above and which are employed as undercoatings for application directly to metal surfaces which are to be subsequently provided with an over coating of paint, constitute excellent compositions for binding subsequently applied rubber coatings to the underlying ferrous metal surfaces. In using such primer compositions in accordance with our invention, the metal surfaces to be treated should be clean prior to the application of the primer composition thereto. The metal primer coating should be dried, e. g., by the usual air-drying methods or it may be subjected to a baking treatment, after which the aqueous dispersion of rubber may be applied by any of the usual methods for applying coating compositions. Rubber from an aqueous disperson may be deposited in situ upon the intermediate primer coating by chemical means or by simple drying, the latter method being generally satisfactory and being preferred since it is simpler.

The present method is especially applicable to the preparation of protective rubber linings upon the inner surfaces of ferrous metal containers such as steel containers for formaldehyde solutions. Various types of containers have been used for shipping and storing formaldehyde solutions. Thus, wooden barrels, stainless steel containers, aluminum drums and pitch-lined steel drums have been used for this purpose. The wooden containers are far from satisfactory while the stainless steel and aluminum containers are objected to because of their relatively high initial costs. Steel drums which have been lined with pitch do not serve the purpose well since the pitch lining becomes brittle, chipping off during use so as to expose metal surfaces of the drum to the formaldehyde solution. Since formaldehyde in contact with iron or steel takes up objectionable quantities of iron, these pitch-lined drums, although they have been used to a considerable extent are far from satisfactory.

Iron or steel drums lined with rubber in accordance with our invention, using an intermediate coating of a metal primer composition, are very satisfactory for use in storing and transporting aqueous formaldehyde solution. The rubber linings produced according to our invention are satisfactorily durable, are not porous so that iron contamination of the formaldehyde solution is avoided, and such linings do not peel under shock or flexing. A further advantage is that should the rubber linings be accidently torn, they may be stripped off clean from the underlying primer coating and a new lining applied directly to the original primer coating after a prior washing treatment. The fact that the rubber linings may be removed in this manner does not mean that adhesion of the rubber lining to the underlying primer composition is poor; as a matter of fact, adhesion is satisfactory for most practical purposes and we have found that the present rubber lined drums may be used for the handling and storage of aqueous formaldehyde solutions over extended periods of time without any loosening of the rubber lining occurring. This, together with the fact that the rubber linings are easily and cheaply applied, renders the present method and the resulting rubber lined containers very practical for commercial use.

The present method of applying protective rubber coatings to the surface of iron and steel articles is simple and very practical. The iron or steel surfaces to which the rubber coating is to be applied should of course be cleaned, e. g., by sand-blasting, pickling or by any other usual cleaning operation. The surfaces are then coated with a metal primer composition as defined above, which compositions usually contain metal oxide pigments such as iron oxides, lead oxides, zinc oxides, zinc or lead chromates and/or basic white lead and the like, together with a vehicle composed of linseed oil or a suitable resin and a solvent, together with a drier. The primer coating may be dried by air-drying methods or may be baked on the iron or steel surfaces, and if necessary a second primer coating may be applied. Baking at, for example, 250 to 300° F. for about 20 minutes gives excellent results and this procedure is preferred. We have found that the primer composition prior to application to the metal surface should preferably not be too thick, since otherwise, coatings containing pin holes may result. However, this difficulty may be easily corrected by applying a plurality of primer coatings or by thinning the usual commercial primer composition by stirring in, for example, a suitable amount of a solvent, such as naphtha or the like. After the application of the undercoating of metal primer, we apply to the surface of the primer coating an aqueous dispersion of rubber. The term "rubber" is employed in the present application and in the appended claims to include balata, gutta-percha, caoutchouc and the like, either in the natural state as latex or in the coagulated, vulcanized, or reclaimed state. Rubber may be deposited in situ upon the primer coating from the aqueous dispersion by any of the usual methods, e. g., by well known chemical means or by simple drying, preferably by the latter method. The resulting rubber coating will be found to adhere well to the underlying primer coating and to serve as an excellent protective coating for the ferrous metal article.

We have found that our invention is particularly well suited for the application of protective rubber linings to the inner surfaces of ferrous metal containers. In this modification of the invention the heads and shell of, for example a steel drum, may be coated, e. g., by brushing, spraying, etc., with the metal primer composition either before or after assembly of the drum. After the drum has been provided with a metal primer coating on its inner surfaces, a suitable quantity of, for example, a rubber latex may be added to the drum and the latter rotated so that all of the inner surfaces will be covered by the latex composition. Excess latex may then be removed by simply draining the drum, after which the drum may be air-dried either at ordinary temperatures or by the use of heated air. As has been noted above drums provided with rubber linings in this manner are especially well suited for use in storing and handling formaldehyde solution.

We have prepared rubber lined drums in the manner described in the preceding paragraph by using a metal primer containing approximately 48% by weight of pigment and 52% by weight of a vehicle. The composition of the pigment in the primer consisted of approximately 44% of sesquioxide of iron based on the total weight of the pigment, 15% zinc oxide, 10% basic zinc chromate and 31% of silicates. The vehicle of the metal primer consisted of about 37% of an alkyd resin gum based upon the total weight of the vehicle, 58% of an aliphatic hydrocarbon solvent and 5% by weight of a conventional drier such as a cobalt or manganese drier. This metal primer composition was found to give excellent results for the present purpose and may be applied to the ferrous metal surfaces to be coated by any of the usual methods employed for such purposes. The primer coating may be air-dried or may be baked at elevated temperatures prior to the application of the aqueous dispersion of rubber, e. g., rubber latex.

Another very satisfactory metal primer composition consists of approximately 46% by weight of pigment and 54% by weight of a vehicle. The pigment may consist of about 35% of basic lead chromate, based on the total weight of the pigment, 13% sesquioxide or iron, 10% zinc oxide, 5% basic sulfate white lead and 37% by weight of silicates. The vehicle may consist of 48% of a linseed oil-alkyd compound based upon the total weight of the vehicle, together with about 10% of a drier and 42% of an aliphatic hydrocarbon solvent.

The above specific metal primer compositions are mentioned merely as illustrative of the metal primers that may be used in accordance with our invention. Other pigmented primer compositions containing a drying constituent, e. g., the usual red lead in linseed oil metal primer and various known modifications thereof, may be used with excellent results. We have found that rubber lined drums prepared by the use of such primers, for example the primers specifically described above, and also the usual red lead primers, may be used for the storing and handling of formaldehyde for extended periods of time without there resulting any substantial increase in the iron content of the formaldehyde solution. Thus formaldehyde stored in such rubber lined drums has been found to have picked up no substantial amounts of iron even after periods more than six months. It is thus apparent that the present rubber lined drums are especially suitable for the storage and handling of formaldehyde solutions and may of course be used for other obvious purposes.

With respect to the aqueous dispersions of rubber which are used in practicing our invention, we prefer to employ concentrated dispersions, e. g., dispersions containing 50-70% by weight of rubber solids. However, less concentrated dispersions may be used, e. g., dispersions containing as low as 30% by weight of rubber. When such less concentrated dispersions are employed it may be necessary to apply more than one coating of the dispersion. The most practical aqueous dispersion of rubber for the present purpose is a rubber latex containing in the neighborhood of 60-65% by weight of rubber solids. Such a latex may be used in a single coating operation to give a rubber lining of satisfactory thickness for most purposes. While we prefer to employ latex of the above concentration, aqueous dispersions of rubber of higher or lower concentrations may of course be used.

It will be apparent to those skilled in the art that many widely different modifications of our invention may be made without departing from the spirit and scope thereof. The invention, therefore, is not intended to be limited by the foregoing description thereof except as indicated in the appended claims.

We claim:

1. The method of coating a ferrous metal surface with rubber which comprises applying a coating of a metal primer composition which is devoid of rubber and rubber derivatives directly to said surface and depositing a rubber coating on said coating of metal primer from an aqueous dispersion of rubber, said metal primer composition containing a substantial amount of a pigment selected from the group of metal compounds consisting of iron oxides, lead oxides, zinc oxide, zinc chromate, lead chromate, basic white lead, and mixtures of at least two of said compounds.

2. The method of coating a ferrous metal surface with rubber which comprises applying a coating of a metal primer composition which is devoid of rubber and rubber derivatives directly to said surface and depositing a rubber coating on said coating of metal primer from a rubber latex, said metal primer composition containing a substantial amount of a pigment selected from the group of metal compounds consisting of iron oxides, lead oxides, zinc oxide, zinc chromate, lead chromate, basic white lead, and mixtures of at least two of said compounds.

3. The method of coating a ferrous metal surface with rubber which comprises applying a coating of a metal primer composition which is devoid of rubber and rubber derivatives directly to said surface and depositing a rubber coating on said coating of metal primer from a rubber latex containing 60 to 70% of rubber solids dispersed therein, said metal primer composition containing a substantial amount of a pigment selected from the group of metal compounds consisting of iron oxides, lead oxides, zinc oxide, zinc chromate, lead chromate, basic white lead, and mixtures of at least two of said compounds.

4. The method of coating a ferrous metal surface with rubber which comprises applying a coating of a metal primer composition which is devoid of rubber and rubber derivatives directly to said surface, drying the resulting metal primer coating, applying to said primer coating a coating of an aqueous dispersion of rubber and drying said last named coating, said metal primer composition containing a substantial amount of a pigment selected from the group of metal compounds consisting of iron oxides, lead oxides, zinc oxide, zinc chromate, lead chromate, basic white lead, and mixtures of at least two of said compounds.

5. The method of coating a ferrous metal surface with rubber which comprises applying a coating of a metal primer composition which is devoid of rubber and rubber derivatives directly to said surface, drying the resulting metal primer coating, applying to said primer coating a coating of a rubber latex and drying said last named coating, said metal primer composition containing a substantial amount of a pigment selected from the group of metal compounds consisting of iron oxides, lead oxides, zinc oxide, zinc chromate, lead chromate, basic white lead, and mixtures of at least two of said compounds.

6. The method of coating a ferrous metal surface with rubber comprising applying directly to said surface a red lead metal primer composition, drying the resulting primer coating, and depositing a rubber coating on said primer coating from a rubber latex, said primer composition being devoid of rubber and rubber derivatives.

7. The method of coating a ferrous metal surface with rubber comprising applying directly to said surface a metal primer composition comprising an alkyd resin vehicle having suspended therein pigments including sesquioxide of iron, zinc oxide, basic zinc chromate and silicate, drying the resulting primer coating, and depositing a rubber coating on said primer coating from a rubber latex, said primer composition being devoid of rubber and rubber derivatives.

8. The method of coating a ferrous metal surface with rubber comprising applying directly to said surface a metal primer composition comprising an alkyd resin vehicle having suspended therein pigment including basic lead chromate, sesquioxide of iron, zinc oxide, basic sulfate white lead and silicate, drying the resulting primer coating, and depositing a rubber coating on said primer coating from a rubber latex, said primer composition being devoid of rubber and rubber derivatives.

9. An article comprising a ferrous metal member having adhering directly to a ferrous metal surface thereof a primer coating which is devoid of rubber and rubber derivatives and which has been derived from a metal primer composition containing a substantial amount of a pigment selected from the group of metal compounds consisting of iron oxides, lead oxides, zinc oxide, zinc chromate, lead chromate, basic white lead, and mixtures of at least two of said compounds, and a rubber coating bonded to said metal member by said primer coating.

10. An article comprising a ferrous metal member having adhering directly to a ferrous metal surface thereof a primer coating which is devoid of rubber and rubber derivatives and which has been derived from a metal primer composition containing a substantial amount of a pigment selected from the group of metal compounds consisting of iron oxides, lead oxides, zinc oxide, zinc chromate, lead chromate, basic white lead, and mixtures of at least two of said compounds, and a rubber coating deposited from an aqueous dispersion of rubber on said primer coating.

11. An article comprising a ferrous metal member having adhering directly to a ferrous metal surface thereof a primer coating which is devoid of rubber and rubber derivatives and which has been derived from a metal primer composition containing a substantial amount of a pigment selected from the group of metal compounds consisting of iron oxides, lead oxides, zinc oxide, zinc chromate, lead chromate, basic white lead, and mixtures of at least two of said compounds, and a rubber coating deposited from a rubber latex on said primer coating.

12. A container comprising a ferrous metal containing member having a protective rubber coating bonded to its inner surface solely by means of an intermediate metal primer coating which is devoid of rubber and rubber derivatives and has been derived from a metal primer composition containing a substantial amount of a pigment selected from the group of metal compounds consisting of iron oxides, lead oxides, zinc oxide, zinc chromate, lead chromate, basic white lead, and mixtures of at least two of said compounds.

13. A container comprising a ferrous metal containing member having a protective rubber coating bonded to its inner surface solely by means of an intermediate metal primer coating, said rubber coating having been deposited on said primer coating from a rubber latex and said primer coating being devoid of rubber and rubber derivatives and having been derived from a metal primer composition containing a substantial amount of a pigment selected from the group of metal compounds consisting of iron oxides, lead oxides, zinc oxide, zinc chromate, lead chromate, basic white lead, and mixtures of at least two of said compounds.

14. A container comprising a ferrous metal containing member having a protective rubber coating bonded to its inner surfaces solely by means of an intermediate red lead metal primer coating which is devoid of rubber and rubber derivatives.

15. A container comprising a ferrous metal containing member having a protective rubber coating bonded to its inner surfaces solely by means of an intermediate metal primer coating which is devoid of rubber and rubber derivatives and which has been derived from a metal primer composition comprising an alkyl resin vehicle having suspended therein pigments including sesquioxide of iron, zinc oxide, basic zinc chromate and silicate.

16. A container comprising a ferrous metal containing member having a protective rubber coating bonded to its inner surfaces solely by means of an intermediate metal primer coating which is devoid of rubber and rubber derivatives and which has been derived from a metal primer composition comprising an alkyl resin vehicle having suspended therein pigments including basic lead chromate, sesquioxide of iron, zinc oxide, basic sulfate white lead and silicate.

GEORGE CORBIN BAILEY.
OSCAR JOHNSON.